United States Patent
Maharana et al.

(10) Patent No.: US 8,984,234 B2
(45) Date of Patent: Mar. 17, 2015

(54) SUBTRACTIVE VALIDATION OF CACHE LINES FOR VIRTUAL MACHINES

(71) Applicant: LSI Corporation, San Jose, CA (US)

(72) Inventors: Parag R. Maharana, Fremont, CA (US); Luca Bert, Cumming, GA (US); Earl Cohen, Oakland, CA (US)

(73) Assignee: LSI Corporation, San Jose, CA (US)

( * ) Notice: Subject to any disclaimer, the term of this patent is extended or adjusted under 35 U.S.C. 154(b) by 203 days.

(21) Appl. No.: 13/739,804

(22) Filed: Jan. 11, 2013

(65) Prior Publication Data

US 2014/0201462 A1     Jul. 17, 2014

(51) Int. Cl.
*G06F 12/08* (2006.01)
*G06F 9/455* (2006.01)

(52) U.S. Cl.
CPC ............ *G06F 12/0895* (2013.01); *G06F 9/455* (2013.01)
USPC .......................................... 711/142; 711/118

(58) Field of Classification Search
USPC .................................................. 711/142, 118
See application file for complete search history.

(56) References Cited

U.S. PATENT DOCUMENTS

| 2012/0089786 A1 | 4/2012 | Pruthi |
| 2012/0102137 A1 | 4/2012 | Pruthi et al. |

*Primary Examiner* — Yong Choe
(74) *Attorney, Agent, or Firm* — Suiter Swantz pc llo (57) ABSTRACT

A method and system for managing a cache for a host machine is disclosed. The method includes: indicating each cache line in the cache as being in a transitional meta-state when any virtual machine hosted on the host machine moves out of the host machine; each time a particular cache line is accessed, indicating that particular cache line as no longer in the transitional meta-state; and marking the cache lines still in the transitional meta-state as invalid when a virtual machine moves back to the host machine.

20 Claims, 6 Drawing Sheets

| Cache Line | Meta-State | State | Data |
|---|---|---|---|
| 1 | T | | |
| 2 | T | | |
| 3 | T | | |
| 4 | T | | |
| 5 | T | | |
| 6 | T | | |
| 7 | T | | |
| 8 | T | | |

FIG. 5B

| Cache Line | Meta-State | State | Data |
|---|---|---|---|
| 1 | T | | |
| 2 | - | | |
| 3 | - | | |
| 4 | - | | |
| 5 | T | | |
| 6 | T | | |
| 7 | - | | |
| 8 | T | | |

FIG. 6A

| Cache Line | Meta-State | State | Data |
|---|---|---|---|
| 1 | T | | |
| 2 | T | | |
| 3 | T | | |
| 4 | T | | |
| 5 | T | | |
| 6 | T | | |
| 7 | T | | |
| 8 | T | | |

FIG. 6B

| Cache Line | Meta-State | State | Data |
|---|---|---|---|
| 1 | T | | |
| 2 | - | | |
| 3 | - | | |
| 4 | - | | |
| 5 | T | | |
| 6 | T | | |
| 7 | - | | |
| 8 | T | | |

FIG. 6C

| Cache Line | Meta-State | State | Data |
|---|---|---|---|
| 1 | T; T' | | |
| 2 | T' | | |
| 3 | T' | | |
| 4 | T' | | |
| 5 | T; T' | | |
| 6 | T; T' | | |
| 7 | T' | | |
| 8 | T; T' | | |

FIG. 6D

| Cache Line | Meta-State | State | Data |
|---|---|---|---|
| 1 | - | | |
| 2 | - | | |
| 3 | - | | |
| 4 | T' | | |
| 5 | T; T' | | |
| 6 | - | | |
| 7 | T' | | |
| 8 | T; T' | | |

FIG. 7A

| Cache Line | Meta-State | VM ID | State | Data |
|---|---|---|---|---|
| 1 | T | 1 | | |
| 2 | T | 1 | | |
| 3 | T | 1 | | |
| 4 | T | 2 | | |
| 5 | T | 2 | | |
| 6 | T | 2 | | |
| 7 | T | 2 | | |
| 8 | T | 2 | | |
| ⋮ | | | | |

FIG. 7B

| Cache Line | Meta-State | VM ID | State | Data |
|---|---|---|---|---|
| 1 | T | 1 | | |
| 2 | - | 1 | | |
| 3 | - | 1 | | |
| 4 | - | 2 | | |
| 5 | T | 2 | | |
| 6 | T | 2 | | |
| 7 | - | 2 | | |
| 8 | T | 2 | | |
| ⋮ | | | | |

SUBTRACTIVE VALIDATION OF CACHE LINES FOR VIRTUAL MACHINES

TECHNICAL FIELD

The present invention relates to the field of data management and particularly to data management for cache systems supporting virtual machines.

BACKGROUND

A virtual machine (VM) is a software implementation of a machine (e.g., a computer) that executes programs like a physical machine. One or more VMs may be supported by a host machine, which may also provide data caching for the VMs.

Certain virtualization technologies allow VMs to be moved from one host machine to another. While such technologies are useful, maintaining cache coherence for the VMs is challenging and therein lies the need to provide a method and system to provide data management for cache systems supporting virtual machines.

SUMMARY

Accordingly, an embodiment of the present disclosure is directed to a method for managing a cache for a host machine. The method includes: indicating each cache line in the cache as being in a transitional meta-state when any virtual machine hosted on the host machine moves out of the host machine; each time a particular cache line is accessed, indicating that particular cache line as no longer in the transitional meta-state; and marking the cache lines still in the transitional meta-state as invalid when a virtual machine moves back to the host machine.

A further embodiment of the present disclosure is directed to a method for managing a cache for a host machine. The method includes: indicating each cache line in the cache as being in a first transitional meta-state when a first virtual machine hosted on the host machine moves out of the host machine; indicating each cache line in the cache as being in a second transitional meta-state when a second virtual machine hosted on the host machine moves out of the host machine; each time a particular cache line is accessed, indicating that particular cache line as no longer in any transitional meta-state; and when the first virtual machine moves back to the host machine, marking solely the cache lines in the first transitional meta-state as invalid.

An additional embodiment of the present disclosure is directed to a system. The system includes a host machine configured to host at least one virtual machine. The system also includes a cache configured to provide a cache storage space for the virtual machine(s) hosted on the host machine. A cache controller is utilized to manage the cache in accordance to a cache management method. The cache management method includes: indicating each cache line in the cache as being in a transitional meta-state when any virtual machine hosted on the host machine moves out of the host machine; each time a particular cache line is accessed, indicating that particular cache line as no longer in the transitional meta-state; and marking the cache lines still in the transitional meta-state as invalid when any virtual machine previously hosted on the host machine moves back to the host machine.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

In a non-virtualized system, the operating system (OS) of that non-virtualized system provides cache management functions such as determining hit/miss/fill rate and data operations. A virtual machine (VM, may also be referred to as virtualized/guest OS), on the other hand, acts rather differently as the cache management functions are provided by its host OS (may also be referred to as hypervisor, parent partition or the like).

Figure 1:
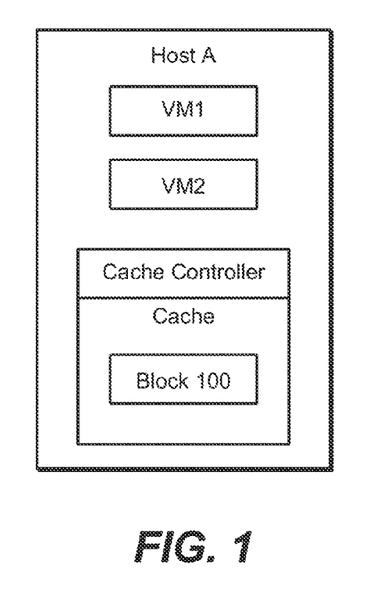
FIG. 1 is a block diagram illustrating a host machine hosting multiple virtual machines.

Referring to FIG. 1, a block diagram depicting a host machine "Host A" configured for hosting one or more VMs is shown. In addition, Host A is also configured for providing a cache for the VMs it hosts. For instance, if it is determined that VM1 frequently accesses data block 100, data block 100 may be placed in the cache for VM1.

Generally, in a virtualized system the VMs do not interface directly with physical storage devices. Instead, each VM is assigned one or more virtual disks, which correspond to portions of one or more physical storage devices communicatively coupled with the host machine. While such virtualization techniques provide flexibilities, certain relationship between the virtual addressing scheme and the physical addressing scheme may not be readily available. For instance, if the virtual disk(s) assigned to VM1 and the virtual disk(s) assigned to VM2 are created on the same storage unit (e.g., same physical disk, same non-virtualized logical unit or the like), the storage controller and associated elements (including the cache controller) generally cannot tell which VM has generated a particular request since the request comes from the same physical machine, i.e., Host A, in this example.

Figure 2:
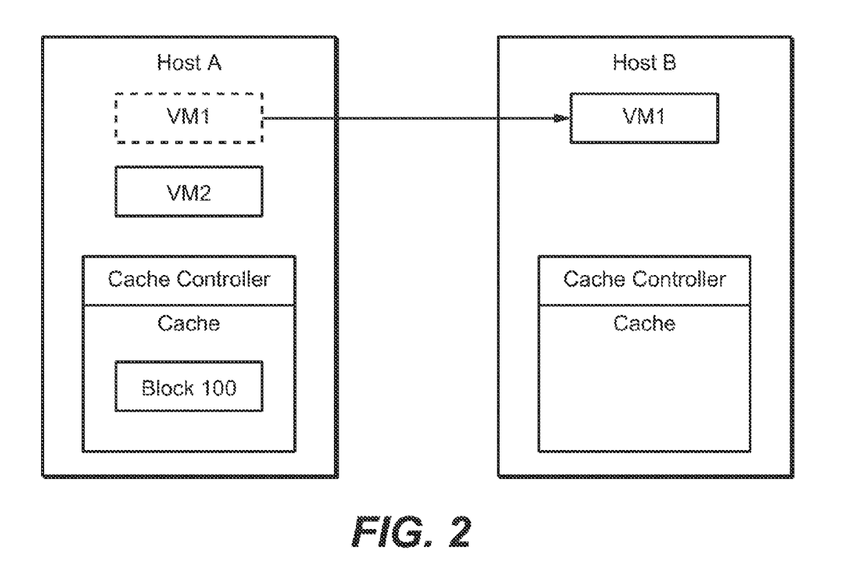
FIG. 2 is a block diagram illustrating a virtual machine moving from a first host machine to a second host machine.
Figure 3:
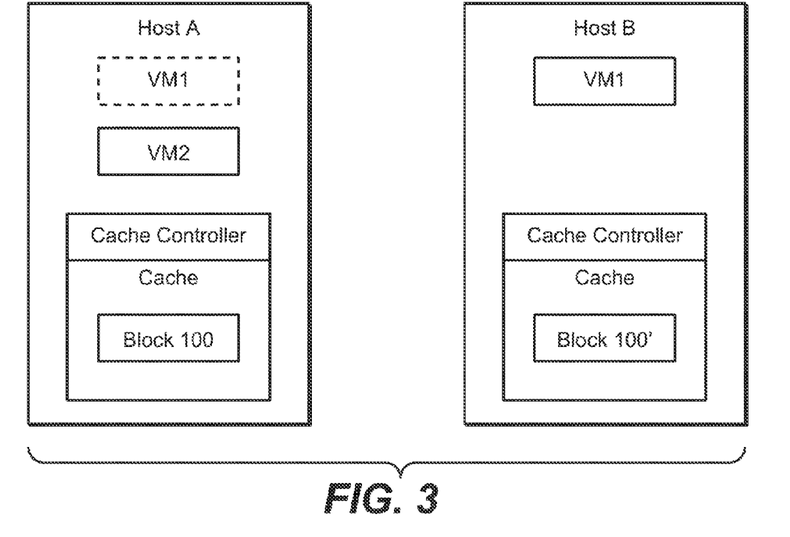
FIG. 3 is a block diagram illustrating the virtual machine hosted on the second host machine modifying a particular data block.
Figure 4:
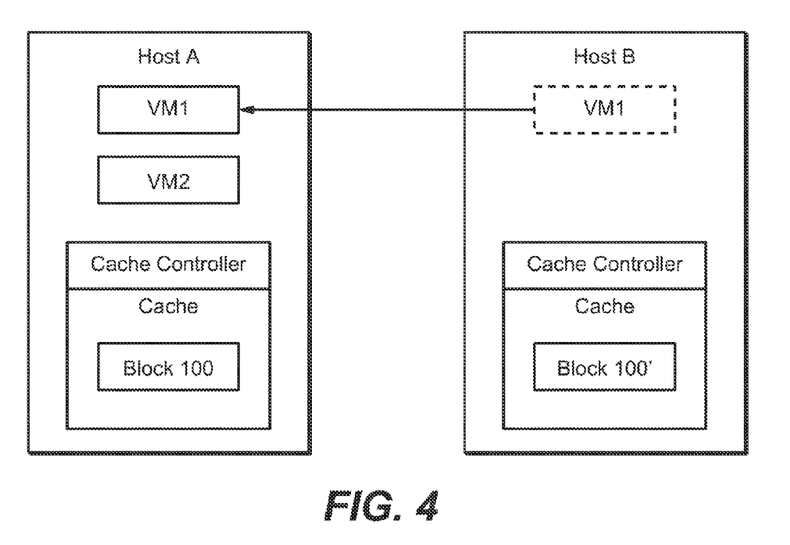
FIG. 4 is a block diagram illustrating the virtual machine moving from the second host machine back to the first host machine.

Consider now an example depicted in FIGS. 2 through 4. Suppose the two virtual machines on Host A, VM1 and VM2, are associated to their respective virtual disks. Suppose VM1 reads data block 100 and that gets cached in Host A. Now, as shown in FIG. 2, suppose VM1 is moved on Host B and that VM1 wants to access data block 100. There is no conflict as data block 100 was either unmodified in previous access on Host A or the cache on Host A is write-through so the physical disk still keeps a valid copy. While VM1 is still hosted on Host B, suppose VM1 wants to update data block 100 with a new value. Under read/write-through cache rules, VM1 will always write the new value to the physical disk and may (under write-through cache rules) or may not (under read cache rules) want to keep a copy in the local cache in Host B as shown in FIG. 3. There is still no conflict so far.

Now suppose that VM1 is moved back to Host A and VM1 wants to read data block 100 again. What happens here is that the cache controller detects that the cache on Host A has a copy of the data and supplies the cached data to VM1. However, this copy is an old copy (stale data) and the cache controller of Host A has no notion that data block 100 was updated while VM1 was executing on Host B and data corruption occurs.

One solution to protect the data is to invalidate all cache entries associated with the affected physical disk when a move occurs. This works, however, in the example above, data requests generated by VM2 are affected too and VM2 will start underperforming until the cache is repopulated with data used by VM2, which may take several minutes to hours. Furthermore, this problem is repeated any time any VM moves. In large configurations (certain virtual desktop infrastructure may have hundreds of VMs that come and go and move around at any time) the cache is possibly invalidated so often that it becomes unusable.

The present disclosure is directed to a method and system to support moving VMs while maintaining the simplicity of read and/or write-through storage caches. The method in accordance with the present disclosure introduces meta-state information to the cache entries (may also be referred to as cache lines) to identify which entries need to be invalidated. By reducing the number of entries that need to be invalidated, as opposed to invalidating all entries associated with an affected physical disk, the method in accordance with the present disclosure improves the system performs and eliminates data corruption as results of moving VMs.

Figure 5A:
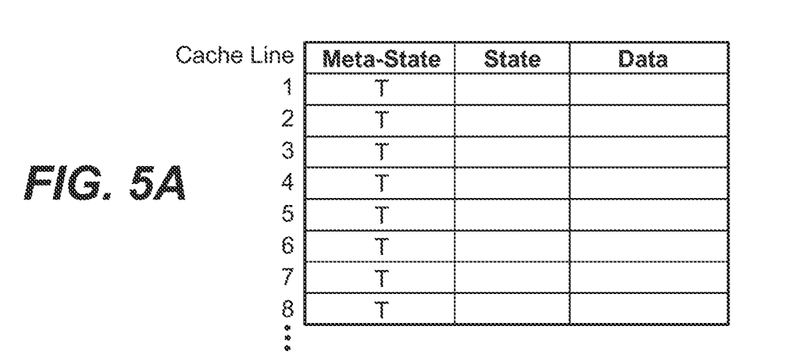
FIGS. 5A and 5B are illustrations depicting meta-state information introduced in accordance with one embodiment of the present disclosure.
Figure 5B:
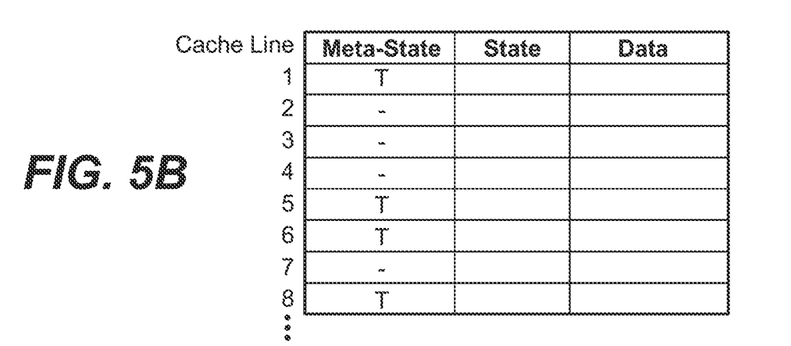

Referring now to FIG. 5, an illustration depicting the utilization of the meta-state in accordance with an embodiment of the present disclosure is shown. For simplicity of the illustration, each cache line is shown to include a meta-state indicator, a state indicator and a data field. It is understood that each cache line may include additional information not explicitly shown in the figures without departing from the spirit and scope of the present disclosure. In some embodiments, physical storage of the cache lines separates the data fields and other fields and/or indicators.

Depending on the specific caching algorithm utilized, the state indicator of each cache line may indicate one of various possible states, such as invalid, valid, shared, owned, reserved, dirty or the like. It is noted, as will be described in detail below, that the meta-state information introduced in accordance with the present disclosure is made available as additional information, and it does not interfere with the operation of the caching algorithm.

In one embodiment, each time a VM is moved out from a host machine, the host machine marks the entire cache content as in transition by introducing a meta-state "T" to each cache line. It is important to note that the meta-state is associated with each cache line and is not a global variable.

Now suppose one of the VMs hosted on the host machine is moved out and therefore the meta-state of all cache lines are marked "T" as indicated in FIG. 5A. The other VMs hosted on the host machine still remain functional. That is, the remaining VMs still issue data requests which still go through the cache controller of the host machine with no direct performance impact due to the VM that was moved. In accordance with the present disclosure, the cache controller operates in the same manner according to the caching algorithm; the only additional process needed is for each cache line that is accessed or replaced, the meta-state of that cache line is no longer marked as "T", i.e., moved out of the transition meta-state to valid state.

What the above is doing is actually using a subtractive method: all lines are initially marked "T", but each time one is accessed or replaced the "T" meta-state is removed. In this manner, cache lines that are accessed or replaced by VMs that are still hosted on the host machine will be moved out of the transition meta-state and mark as valid cache. As more data requests are being processed, the only cache lines still marked as "T" are the ones related to the VM that moved out, or cache lines that are not frequently accessed and have not yet been selected for replacement. Furthermore, if the system works undisturbed long enough, all the original entries that were related to the VM that was moved out will decay and be replaced by the caching algorithm.

In some embodiments, if a second VM is moved out prior to any VM moving back, the host machine again marks the entire cache content as in transition by introducing a meta-state "T" to each cache line.

Suppose now the VM that was moved out is moving back to the host machine (the condition shown above that creates data corruption). In this embodiment, upon any VM moving back to the host machine, all cache lines that are still marked with meta-state "T" will now be considered invalid. This is achieved by changing the state of such cache lines to "Invalid" regardless of their previous state. For instance, as depicted in FIG. 5B, the state of cache lines 1, 5, 6 and 8 will be changed to "Invalid" when any VM that previously moved out from the host machine is now moving back. In some embodiments, all cache lines still having the meta-state "T" are invalidated when any VM is moving back. In other embodiments, each host machine tracks VM identifiers (such as unique VM IDs) of each VM that has moved out since a last cache invalidation, and, all cache lines still having the meta-state "T" are invalidated when any VM in the tracking list is moving back.

It is contemplated that invalidating such cache lines prevents data corruption scenarios shown above. Furthermore, it is contemplated that a majority of the cache lines that need to be invalidated would belong to the VM that previously moved out as other cache lines being accessed or replaced by other VMs would no longer be marked as "T" given a reasonable time window, this improves the overall system performance in comparison to invaliding all cache entries when a VM is moved.

It is also contemplated that the marking "T" depicted in the figures are utilized only for illustrative purposes. Whether a cache line is in a transition meta-state may be recorded/tracked using a single bit associated with each cache line. The meta-state information for each line may also be recorded and/or tracked in various other ways without departing from the spirit and scope of the present disclosure.

Figure 6A:
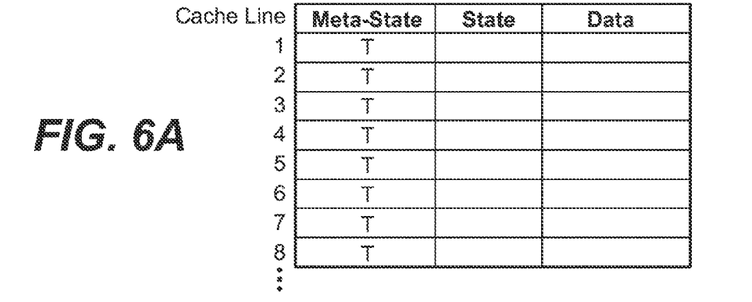
FIGS. 6A through 6D are illustrations depicting meta-state information introduced in accordance with an alternative embodiment of the present disclosure.
Figure 6B:
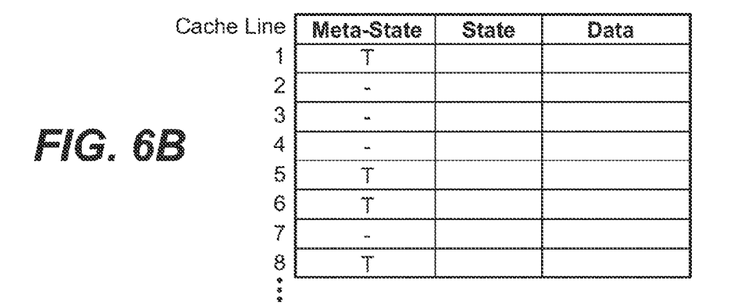

Furthermore, it is contemplated that more than one meta-state may be utilized to further qualify each cache line. For instance, in an alternative embodiment as depicted in FIG. 6, different meta-states are utilized for different VMs to further reduce the number of cache lines that need to be invalidated. In this example, when VM1 moves out of a host machine, all cache lines are marked as T as shown in FIG. 6A. As operation continues, suppose cache lines 2, 3, 4 and 7 are accessed or replaced, such lines are no longer marked T (shown in FIG. 6B) as previously described.

Figure 6C:
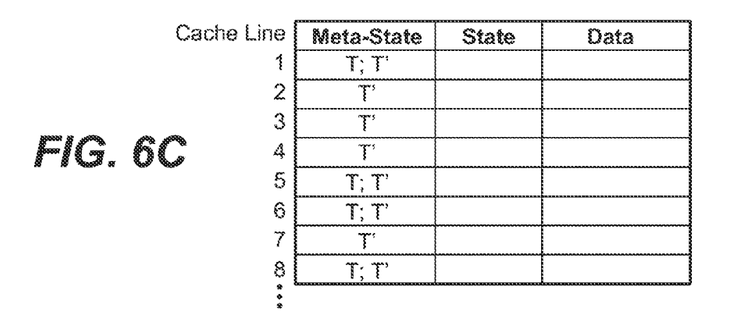
Figure 6D:
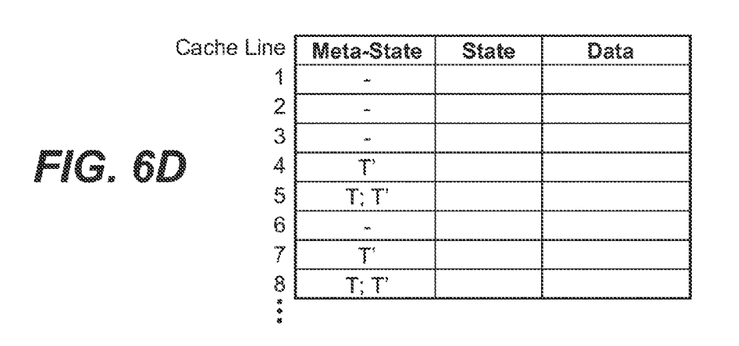

Now suppose VM2 also moves out of the host machine, a different meta-state, T', is used to mark all cache lines as shown in FIG. 6C. As operation continues, suppose cache lines 1, 2, 3 and 6 are accessed or replaced, such lines are no longer marked with any meta-state information, as shown in FIG. 6D. Suppose VM1 moves back now, only the lines still marked T need to be invalidated, and in this example the lines that need to be invalidated are lines 5 and 8. On the other hand, suppose VM2 moves back, only the lines still marked T' need to be invalidated, and in this example the lines that need to be invalidated are lines 4, 5, 7 and 8.

It is contemplated that the number of meta-states supported may be determined based on the number of VMs hosted on the host machine. For instance, each VM may be associated with a unique marking/identifier and such markings/identifiers may be recorded/tracked as meta-states. Alternatively, a predetermined number of meta-states may be made available, and each VM that is moving out of the host machine may be associated with one of the available meta-states. For instance, two meta-states, T and T', are made available in the examples shown above. Each VM that is moving out of the host machine is associated with one of the available meta-states. On the other hand, each VM that is moving back to the host machine returns its associated meta-state back to the available meta-states.

Now if a third VM (VM3) is moving out of the host machine and all available meta-states have been assigned to other VMs, two options are available: 1) share a meta-state—pick the one of the T or T' marks that has the greatest usage, say T', re-mark all lines with T', and associate T' with both VM2 and VM3 (so then when either VM2 or VM3 moves back, all the T' lines are invalidated and the T' mark is then made available again); or 2) pick the one of the T or T' marks that has the least usage, say T, invalidate all lines marked as T, and then associate T with VM3 and re-mark all lines T again.

It is contemplated that whether to assign a unique meta-state for each VM or to provide a predetermine number of available meta-states is a design choice, which may be determined based on the resources available, the computation complexity, the timing requirements as well as other design factors. It is understood that the specific data structure utilized to record/track the meta-state information in accordance with the present disclosure may vary. For instance, the meta-state information may be recorded/tracked in a table, as a bit-mask, or in-line with each cache entries without departing from the spirit and scope of the present disclosure.

Figure 7A:
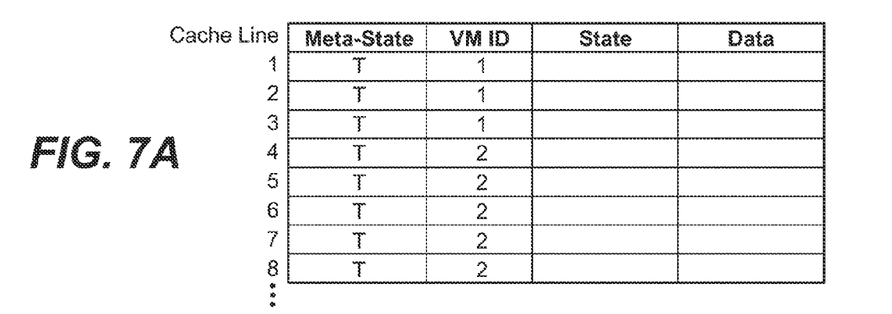
FIGS. 7A and 7B are illustrations depicting meta-state information introduced in accordance with still an alternative embodiment of the present disclosure.
Figure 7B:
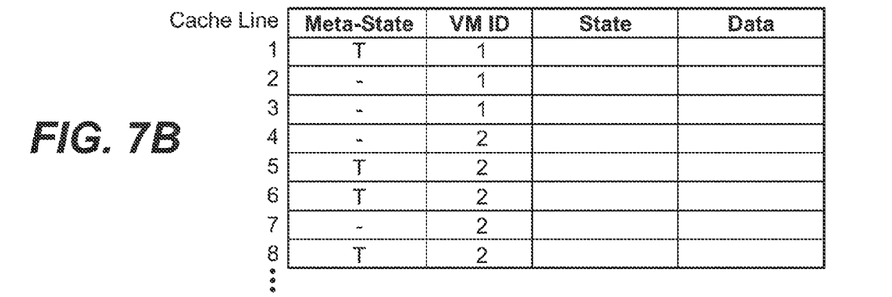

It is further contemplated that certain virtualized systems may be able to provide information regarding the specific VM that issued a data request. In such systems, if the identifications of the VM (VM IDs) are known when cache lines are created, accessed or replaced, such IDs can be tracked/recorded as additional references to further reduce the number of cache lines that need to be invalidated. For instance, in an alternative embodiment as illustrated in FIG. 7, an additional VM ID is associated with each cache line. In this manner, if VM1 moves out of the host machine and then moves back at a later time, only cache lines marked "T" (same process as described above) and associated with VM1(identified by the VM IDs) need to be invalidated. That is, in the example shown in FIG. 7B, only cache line 1 needs to be invalidated while cache lines 5, 6 and 8 may keep their existing state because they are not associated with VM1.

Figure 8:
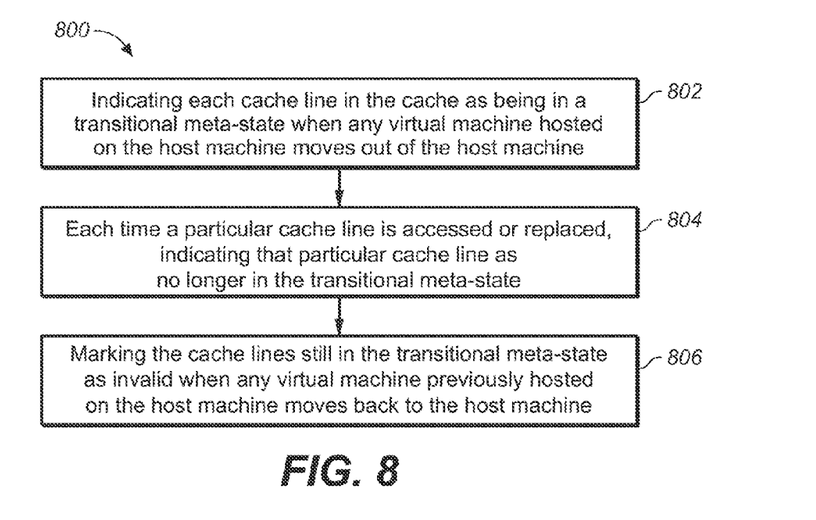
FIG. 8 is a flow diagram illustration a method for providing data management for cache systems supporting virtual machines.

Referring now to FIG. 8, a method 800 for managing a cache for a host machine is shown. In one embodiment, when any virtual machine hosted on the host machine moves out of the host machine, step 802 marks each cache line in the cache as being in a transitional meta-state. Subsequently, each time a particular cache line is accessed or replaced, step 804 indicates that particular cache line is no longer in the transitional meta-state. When any virtual machine moves back to the host machine, step 806 marks all cache lines that are still in the transitional meta-state as invalid to eliminate any potential data corruptions.

Figure 9:
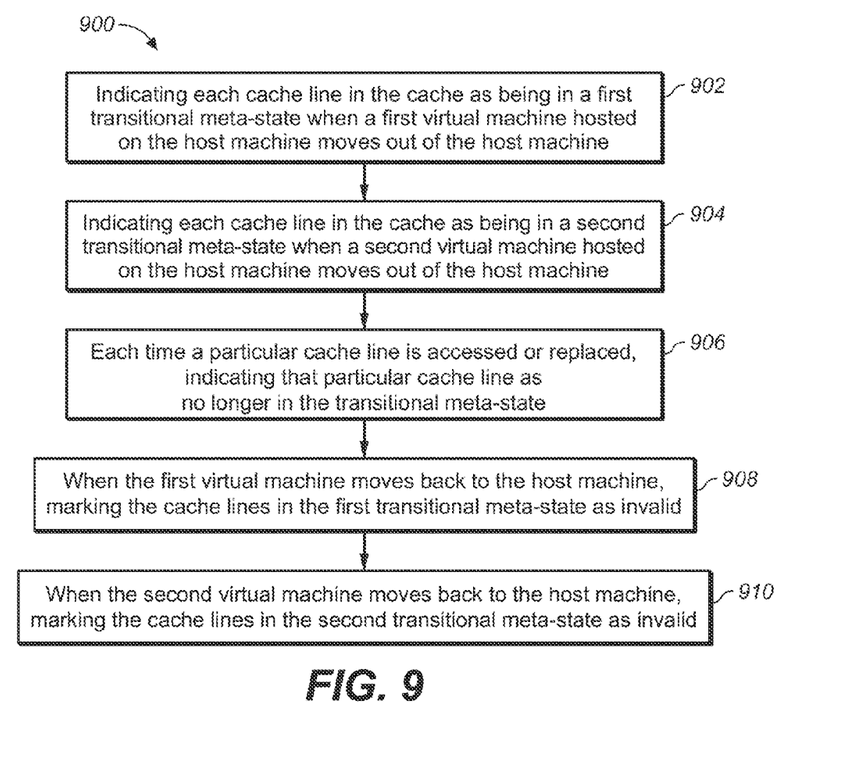
FIG. 9 is a flow diagram illustration an alternative method for providing data management for cache systems supporting virtual machines.

FIG. 9 shows an alternative method 900 for managing a cache for a host machine. In the alternative embodiment, when a first virtual machine hosted on the host machine moves out of the host machine, step 902 marks each cache line in the cache as being in a first transitional meta-state. Similarly, when a second virtual machine hosted on the host machine moves out of the host machine, step 904 marks each cache line in the cache as being in a second transitional meta-state. Each time a particular cache line is accessed or replaced, step 906 indicates that particular cache line is no longer in any transitional meta-state. In this manner, when the first virtual machine moves back to the host machine, step 908 marks all cache lines that are still in the first transitional meta-state as invalid to eliminate any potential data corruptions. Similarly, when the second virtual machine moves back to the host machine, step 910 marks all cache lines that are still in the second transitional meta-state as invalid to eliminate any potential data corruptions.

It is contemplated that the cache management methods described above may be utilized by the cache controller of the host machine. It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for managing a cache for a host machine, the method comprising:
    indicating each cache line in the cache as being in a transitional meta-state when any virtual machine hosted on the host machine moves out of the host machine;
    each time a particular cache line is accessed, indicating that particular cache line as no longer in the transitional meta-state; and
    marking the cache lines still in the transitional meta-state as invalid when any virtual machine previously hosted on the host machine moves back to the host machine.

2. The method of claim 1, wherein a virtual machine that moved out of the host machine is the same virtual machine moving back to the host machine.

3. The method of claim 1, wherein a virtual machine that moved out of the host machine is different from a virtual machine moving back to the host machine.

4. The method of claim 1, wherein the cache implements a write-through policy.

5. The method of claim 1, wherein a respective single-bit meta-state indicator is associated with each cache line in the cache to store the transitional meta-state indication of the cache line.

6. A method for managing a cache for a host machine, the method comprising:
    indicating each cache line in the cache as being in a first transitional meta-state when a first virtual machine hosted on the host machine moves out of the host machine;
    indicating each cache line in the cache as being in a second transitional meta-state when a second virtual machine hosted on the host machine moves out of the host machine;
    each time a particular cache line is accessed, indicating that particular cache line as no longer in any transitional meta-state; and
    when the first virtual machine moves back to the host machine, marking solely the cache lines in the first transitional meta-state as invalid.

7. The method of claim 6, further comprising:
    when the second virtual machine moves back to the host machine, marking solely the cache lines in the second transitional meta-state as invalid.

8. The method of claim 6, further comprising:
    providing a predetermined number of transitional meta-states.

9. The method of claim 8, wherein a particular transitional meta-state available among the predetermined number of transitional meta-states is associated with a particular virtual machine when that particular virtual machine moves out of the host machine.

10. The method of claim 9, wherein the particular transitional meta-state associated with the particular virtual machine is made available for reuse after that particular virtual machine is moved back to the host machine and the cache lines in that particular transitional meta-state are marked as invalid.

11. The method of claim 9, wherein when no transitional meta-state is available for the particular virtual machine, a forced invalidating procedure is invoked.

12. The method of claim 11, wherein the forced invalidating procedure comprises:
    selecting a transitional meta-state;
    marking the cache lines in the selected transitional meta-state as invalid; and
    associating the selected transitional meta-state with the particular virtual machine that is moving out of the host machine.

13. The method of claim 9, wherein when no transitional meta-state is available for the particular virtual machine, a forced sharing procedure is invoked.

14. The method of claim 13, wherein the forced sharing procedure comprises:
    selecting a transitional meta-state currently associated with another virtual machine already moved out of the host machine; and
    associating the selected transitional meta-state with both the other virtual machine already moved out of the host machine and the particular virtual machine that is moving out of the host machine.

15. The method of claim 6, wherein the cache implements a write-through policy.

16. A system, comprising:
    a host machine configured to host at least one virtual machine;
    a cache configured to provide a cache storage space for the least one virtual machine; and
    a cache controller configured to manage the cache in accordance to a cache management method, said method comprising:
        indicating each cache line in the cache as being in a transitional meta-state when any virtual machine hosted on the host machine moves out of the host machine;
        each time a particular cache line is accessed, indicating that particular cache line as no longer in the transitional meta-state; and
        marking the cache lines still in the transitional meta-state as invalid when any virtual machine previously hosted on the host machine moves back to the host machine.

17. The system of claim 16, wherein the method further comprises:
    indicating each cache line in the cache as being in a second transitional meta-state when a second virtual machine hosted on the host machine moves out of the host machine;
    each time a particular cache line is accessed, indicating that particular cache line as no longer in any transitional meta-state; and
    when the first mentioned virtual machine moves back to the host machine, marking solely the cache lines in the first mentioned transitional meta-state as invalid.

18. The system of claim 17, wherein the method further comprises:
    when the second virtual machine moves back to the host machine, marking solely the cache lines in the second transitional meta-state as invalid.

19. The system of claim 17, further comprising:
    providing a predetermined number of transitional meta-states.

20. The system of claim 16, wherein the cache implements a write-through policy.

* * * * *